Aug. 11, 1964     T. CLARK     3,144,630

SONOBUOY APPARATUS

Filed May 19, 1961

WITNESSES

INVENTOR
Trevor Clark
BY *Maury I. Hull*
ATTORNEY

United States Patent Office 3,144,630
Patented Aug. 11, 1964

1

3,144,630
SONOBUOY APPARATUS
Trevor Clark, Annapolis, Md., assignor to Westinghouse Electric Corporation, East Pittsburgh, Pa., a corporation of Pennsylvania
Filed May 19, 1961, Ser. No. 111,312
4 Claims. (Cl. 340—2)

This invention relates to improvements in sonobuoys, and more particularly to an improved sonobuoy including a source of radio frequency energy, self-powered from the adjacent sea water, and containing pressure responsive means responsive to water pressure and responsive to sonic waves, for providing a radio frequency signal the unmodulated frequency of which may provide an indication of the depth of the sonobuoy, and for frequency modulating the generated radio frequency energy in accordance with sonic waves reaching the sonobuoy.

In summary, the invention includes a plurality of tunnel diode or other oscillators each powered by a sea water battery, and all coupled to a single resonant cavity which controls the frequency of oscillation, one wall of which cavity is a flexible diaphragm responsive to instantaneous changes in the pressure of the sea water, and accordingly responsive to sonic vibrations reaching the sonobuoy. These vibrations frequency modulate all the oscillators by varying the resonant frequency of the cavity, and accordingly provide a signal from which intelligence or information as to the frequency and magnitude of sonic waves in the sea, and the depth of the sonobuoy, can be derived.

Accordingly, a primary object of the invention is to provide a new and improved sonobuoy.

Another object is to provide a new and improved sonobuoy containing a sea water powered source of radio frequency energy which is frequency modulated in accordance with sonic waves reaching the sonobuoy, and the unmodulated frequency of which varies with variations in the depth of the sonobuoy.

Another object is to provide a new and improved sonobuoy utilizing a plurality of radio frequency oscillators coupled to a single resonant cavity and operating on the same radio frequency to provide a sonobuoy of increased power and one in which the failure of a single oscillator or a number of oscillators does not render the sonobuoy apparatus inoperative.

Figure 2:
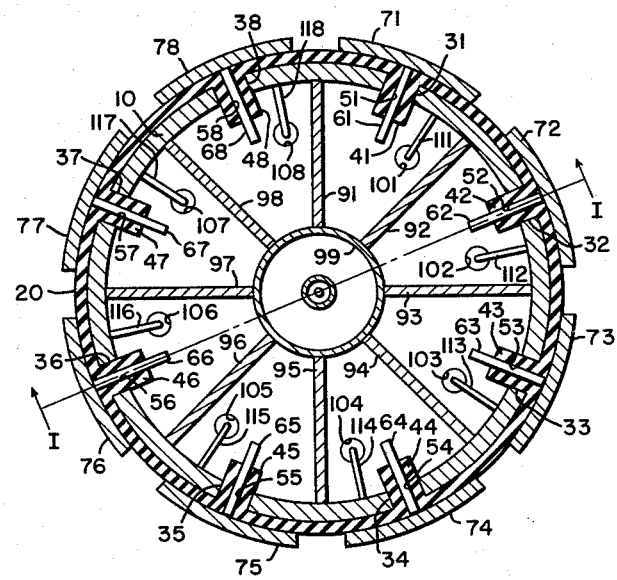
Figure 1:
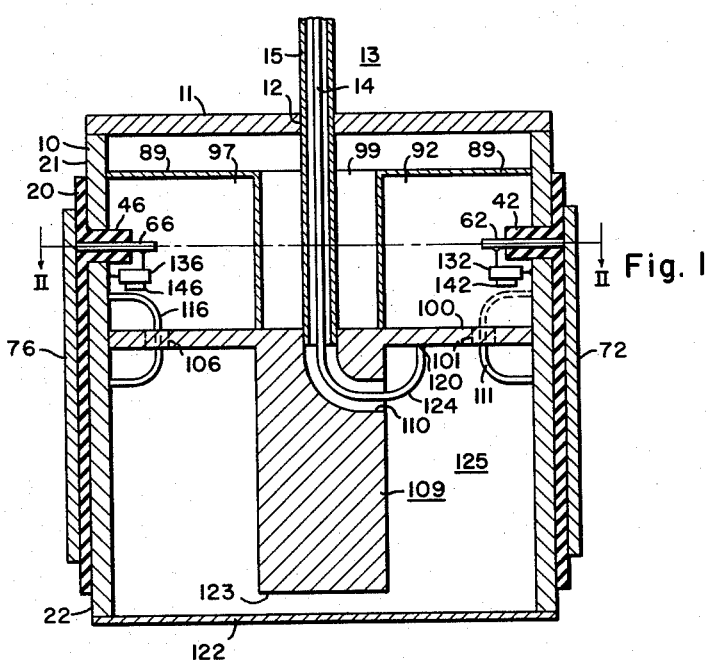

These and other objects will become more clearly apparent after a study of the following specification, when read in connection with the accompanying drawings, in which:

FIGURE 1 is an elevational view partially in cross section of apparatus embodying the invention; and FIGURE 2 is a cross-sectional view through the apparatus in a plane at right angles to the plane of the view of FIG. 1.

Referring now to the drawings for a more detailed understanding of the invention, in which like reference numerals are used throughout to designate like parts, there is shown at 10 a metallic cylinder composed of or coated with a suitable electrochemical material which when immersed in sea water developes a potential difference with respect to another and different electrochemical material. The material on the exterior surface of cylinder 10 may be a first material selected in accordance with its position in the electrode potential series to develop a potential of the desired amplitude and polarity with respect to a second material selected in accordance with its position in the electrode-potential series, and may be composed, for example, of zinc or nickel. Cylinder 10 is closed at the upper end thereof by a closure member 11 having a bore 12 therein for the passage of a concentric cable or other radio frequency energy transmitting device generally designated 13, in this case a concentric cable being shown for illustration, having a center conductor 14 and an outer conductor 15.

Disposed around the outside of the cylinder 10 is a sleeve of insulating material 20, the sleeve being somewhat shorter than the cylinder, as shown, and leaving the cylinder exposed at end portions 21 and 22 so that the sea water may come in contact therewith. The cylinder 10 is seen in FIG. 2 to have a plurality of spaced apertures 31, 32, 33, 34, 35, 36, 37 and 38 therein through which pass a plurality of insulating bushings 41, 42, 43, 44, 45, 46, 47 and 48 respectively which may be formed integrally with the insulating sleeve 20. The bushings have bores 51, 52, 53, 54, 55, 56, 57 and 58 therein respectively, in which are located conductors generally designated 61, 62, 63, 64, 65, 66, 67 and 68 respectively. Mounted on the outside of the insulating sleeve 20 are a plurality of eight electrodes 71–78 inclusive composed of a suitable second electrochemical material chosen in accordance with the choice of the first material, such, for example, as silver or copper, for, in connection with the electrochemical material of the casing or cylinder 10 forming sea water batteries, as will be readily understood by those skilled in the art. It will be noted that one end of each of the conductors 61, 62, 63, 64, 65, 66, 67 and 68 abuts against the adjacent battery plate 71, 72, 73, 74, 75, 76, 77 and 78 respectively, forming one connection to each aforementioned sea water battery. In this manner eight sources of direct current power are available to provide the proper voltage and current for operation of a negative resistance or tunnel diode oscillator when such an oscillator is connected properly between conductor 61, for instance, and the common electrode or case 10.

The oscillator devices, as previously stated, may be semiconductor oscillators, and may be tunnel diode oscillators which, as will be readily understood, provide for the formation of a relatively simple oscillator circuit in view of the fact that the tunnel diode is characterized by negative resistance over a portion of its voltage-current characteristic curve. The choice of materials for the common electrode case 10 and for the electrodes 71 to 78 inclusive is made in such a manner that the two metals when immersed in sea water of average salinity will produce a potential difference lying in the negative resistance range of the tunnel diodes chosen for the oscillators. It may be desirable to use metals which are very close to each other in electrochemical action, the potential difference desired in many cases being less than 1 volt. Case 10 might be copper and electrodes 71–78 might be aluminum. It will be understood that the tunnel diodes are so connected to the batteries, whatever the materials used, that the polarity at the diode is correct. Each of the oscillators may include an external inductor.

Tunnel diode oscillators are known in the art, and for more detailed information reference may be had to an article entitled "The Tunnel Diode—Circuits and Applications," by Lesk, Holonyak, and Davidsohn, appearing in "Electronics," November 27, 1959, pages 60 to 64, inclusive; reference may also be had to "Electronic News," January 11, 1960, page 11, for a circuit of a tunnel diode oscillator, and to an article entitled "Designing Tunnel Diode Oscillators," by Wen-Hsuing Ko, appearing in "Electronics," February 10, 1961, pages 68–72, inclusive. Two of the eight oscillators are shown in FIG. 1 at 132 and 136, having coupling loops 142 and 146 inductively coupled to loops 112 and 116 respectively.

It will be seen from FIG. 1 that the plurality of oscillators are located generally in the upper region or portion of the apparatus as shown in FIG. 1, each of the oscillators being isolated from the adjacent oscillator on both sides thereof by shielding walls, these being designated 91, 92, 93, 94, 95, 96, 97 and 98 and all connected to the cylinder member 10, and connected at the inner ends thereof to a cylindrical member or portion 99 which provides a passageway for the aforementioned coaxial cable generally designated 13. The chambers aforementioned formed by walls 91–98 and containing the oscillators have an upper enclosing plate member or wall portion 89 as shown.

Alternatively, the shielding walls 91 through 98 inclusive might rise to join the top closure plate 11. In like manner, the radial shielding walls may extend inward so that the cylinder 99 is reduced in diameter to the point where it coincides with the external conductor of the coaxial cable 13.

The lower portion of the cylinder 10 is utilized in forming a resonant cavity, the upper wall of the cavity being provided by a plate member 100 of conductive material disposed and suitably retained in position in any convenient manner in the cylinder 10. The plate member 100 has a plurality of apertures therein at predetermined spaced points, these apertures being designated 101 to 108, inclusive and being provided for the passageway of coupling links 111 to 118, inclusive, which couple the respective oscillators to the common resonant cavity.

It is seen, FIG. 1, that the member 100 has a centrally disposed downwardly extending cylindrical shaped portion 109 having an aperture 110 therein for the passage of the coaxial cable 13 and coupling loop or link member 124 which is attached at point 120 to plate member 100 in a manner to provide a coupling loop for taking energy from the cavity.

The lower end of the cylinder 10 is seen to be closed by a diaphragm-like member composed of a suitable flexible material such, for example, as a thin resilient metal such as nickel or Phosphor bronze having sufficient resiliency to be responsive to variations in pressure in the sea water resulting from sound waves reaching the diaphragm. The inside surface of the diaphragm 122 and the cavity 125 should be plated or otherwise coated with copper, silver or gold in order to make the Q of the cavity 125 as high as possible. The outside surface of the diaphragm 122 should be plated with the same material as the outside of cylinder 10 since this surface forms a part of the electrode of the sea water battery. The diaphragm 122 is seen to be normally spaced a small distance from the adjacent surface or wall 123 of the portion 109, and as will be readily understood by those skilled in the art, the resonant frequency of the resonant cavity 125 is determined by the geometry and dimensions of the cavity and more especially by the distance between the surface 123 and the adjacent surface of the diaphragm 122.

In the operation of the apparatus of FIGS. 1 and 2, the eight oscillators including oscillators 132 and 136 are inductively coupled to the upper portion of their respective coupling links 111 to 118, inclusive, energy being transferred by the links from the eight oscillators to the common resonant cavity 125. By deliberate design the "Q" of the tank circuit of each oscillator is made low compared to the "Q" of the resonant cavity. Thus, the cavity coupled to the oscillators pulls the frequency of each of the oscillators into synchronism so that the outputs of all of the oscillators are additive in cavity 125. The frequency of the cavity is determined in a manner well known in the art by selection of the geometry and physical size of the various parts. Power output of the cavity is coupled by coupling coil portion 124 which is connected to the aforementioned coaxial cable center conductor 14, and is through this transmission medium made available for utilization or radiation.

Since the frequency of the cavity 125 is directly affected by the width of the gap between surface 123 and the diaphragm 122, any flexure of the diaphragm 122 will change the frequency of the output. Thus, the diaphragm 122 becomes a transducer which translates the sound waves in the sea water to a physical movement, in turn accomplishing a frequency modulation of the output frequency. Also, the unmodulated frequency varies with variations in the depth of the sonobuoy as changes in pressure in the water with changes in depth cause the diaphragm to assume a position closer to or farther from surface 123.

In using the apparatus of the invention, it is possible to drop a number of these transmitters into the sea from an airplane. The transmission line 13 might be coiled, and be of a suitable length so that the oscillator and transducer combination descend to the desired depth in the sea, the upper end of the cable 13 being supported by a float buoy which supports a simple dipole for radiation. The radio frequency energy radiating from this dipole will then be modulated by sound waves existing in the water and actuating the diaphragm 122. A simple frequency modulation receiver, which may be airborne, completes the system. Hence, the sonobuoy of the invention begins transmitting when cylindrical battery plate 10 and the other battery plates 71 to 78, inclusive, are immersed in sea water. Each complete sonobuoy or each separate oscillator may be tested to determine its operability and its frequency either aboard the dropping airplane or prior to loading aboard the airpalne. Adjustments in frequency may be accomplished by vanes, slots or other means for changing the electrical constants of the cavity as is well known in the art.

In use, the electrodes are consumed slowly as power is generated, and eventually the sonobuoy becomes inoperative. The life may be adjusted by proper selection of the mass of metal used in the electrochemical electrodes 71 to 78, inclusive. It is not intended that this invention shall be restricted to eight separate oscillators, but may consist of any suitable number which will produce the required power output. The resonant cavity 125 and the portion of the apparatus containing the oscillators need not be physically similar, and indeed may be separated from each other a distance if this is found preferable, the oscillators feeding the cavity by coaxial cable or other means. The size of the system may be adjusted or selected depending upon the center frequency chosen, the life desired from the system, the desirability of recovery of the units after use, the size of the transducer diaphragm desired, and many other factors which will be well known to those skilled in the art.

It will be seen that the apparatus has the advantage that if one oscillator ceases to function because of defective construction or exhaustion of the battery associated therewith that the other remaining oscillators will function, the device generally speaking functioning until the last oscillator ceases to generate radio frequency energy.

Whereas the enclosure forming member 10 is shown as cylindrical in shape, it will be understood that other shapes may be employed, if desired.

It should also be noted that the center frequency of the device depends not only upon the geometry of the resonant cavity 125 but also upon the static pressure deformation of diaphragm 122 which will be deformed to approach the center conductor of the cavity 123 more closely as the static pressure on diaphragm 122 increases It is thus possible to set the depth of descent of the device as noted above and to know within very reasonable limits the depth to which it has descended by the resultant frequency of the output. In this way, it is possible to set a group of sonobuoys at depth $a$ to frequencies very close to frequency A while simultaneously having another group of sonobuoys at depth $b$ and at frequencies very close to frequency B. In this manner additional information becomes available from the system.

The term "sonic" as employed herein includes vibrations extending from substantially zero frequency up to and including vibrations of many kilocycles frequency above the hearing range of the average person.

Whereas the invention has been shown and described with respect to an embodiment thereof which gives satisfactory results, it should be understood that changes may be made and equivalents substituted without departing from the spirit and scope of the invention.

I claim as my invention:

1. A sonobuoy comprising, in combination, a plurality of sea water batteries, a plurality of radio frequency oscillators each connected to a sea water battery and energized therefrom, means forming a resonant cavity, a plurality of coupling means coupling said plurality of oscillators to said resonant cavity, all of said oscillators generating radio frequency energy of substantially the same frequency controlled by the frequency of said cavity, said cavity forming means including a flexible diaphragm wall portion responsive to ambient pressure and to sonic waves striking the diaphragm, the movement of said diaphragm in response to the ambient pressure for determining the center resonant frequency of said cavity and responsive to sonic waves for frequency modulating the radio frequency energy, and means connected to the resonant cavity for conducting radio frequency energy therefrom.

2. A sonobuoy comprising, in combination, a closed cylindrical-shaped member composed of a first material selected in accordance with its position in the electrode-potential series and having a flexible diaphragm closing one end thereof, means mounted in said member for dividing the member into portions and forming a resonant cavity for radio frequency energy in the portion adjacent the diaphragm, said means including a wall portion in said cavity extending closely adjacent said diaphragm, the resonant frequency of said cavity varying in accordance with variations in the distance between the diaphragm and said wall portion, a plurality of radio frequency oscillators, a plurality of coupling means coupling the signals generated by said oscillators into said cavity, a plurality of electrode members composed of a second material selected in accordance with its position in the electrode potential series and forming with the cylindrical shaped member a plurality of sea water batteries of preselected polarity and voltage for energizing said plurality of oscillators respectively, and means connected to the resonant cavity for conducting radio frequency energy therefrom, said sonobuoy while immersed in sea water having the diaphragm thereof subjected to the ambient pressure for determining the center resonant frequency, said diaphragm also being responsive to sonic vibrations reaching the sonobuoy whereby the radio frequency energy is frequency modulated about a center resonant frequency which indicates the depth of said sonobuoy.

3. Sonobuoy apparatus comprising, in combination, means forming a resonant cavity, said cavity forming means including a diaphragm wall portion responsive to variations in pressure resulting from sonic waves striking the diaphragm and responsive to variations in water pressure resulting from variations in the depth of the sonobuoy, the center resonant frequency of the cavity varying with variations in the position of the diaphragm, a plurality of radio frequency oscillators, sea water battery means connected to said plurality of oscillators for providing energizing potentials thereto, a plurality of means coupling the plurality of oscillators respectively to the resonant cavity, the frequency of oscillation of all of the oscillators being controlled by the resonant frequency of the cavity, and means for conducting radio frequency energy from the resonant cavity, the radio frequency energy being frequency modulated in accordance with the sonic waves striking said diaphragm.

4. A sonobuoy comprising, means forming a resonant cavity, said cavity forming means including a flexible diaphragm and a cavity wall portion normally spaced from the diaphragm a predetermined distance, the center resonant frequency of said cavity varying with variations in the distance between said diaphragm and said wall portion, a plurality of radio frequency oscillators, means for energizing said plurality of oscillators, a plurality of coupling means coupling said plurality of oscillators to said resonant cavity, each of said oscillators having a low "Q" and said resonant cavity having a high "Q" whereby the frequency of said oscillators are held in synchronism by the center resonant frequency of said cavity, and means connected to the cavity for conducting radio frequency energy therefrom, the distance between said diaphragm and said wall portion varying with variations in pressure against the diaphragm in accordance with the depth of the sonobuoy and determining the center resonant frequency of said cavity, which frequency of said cavity constitutes an indication of the depth of the sonobuoy, said diaphragm being responsive to sonic waves striking the diaphragm for frequency modulating the center resonant cavity frequency.

References Cited in the file of this patent

UNITED STATES PATENTS

| | | |
|---|---|---|
| 1,310,568 | Heap et al. | July 22, 1919 |
| 2,252,370 | Goldstine | Apr. 12, 1941 |
| 2,828,475 | Mason | Mar. 25, 1958 |
| 2,839,920 | MacAnespie | June 24, 1958 |
| 2,957,159 | Fitchette | Oct. 18, 1960 |
| 2,996,611 | Stahl | Aug. 15, 1961 |

FOREIGN PATENTS

| | | |
|---|---|---|
| 813,943 | Great Britain | May 27, 1959 |

OTHER REFERENCES

"The Tunnel Diode—Circuits and Applications," by Holonyak and Davidsohn, Electronics, vol. 32, No. 48, Nov. 27, 1959 (pp. 60–64 relied on).